Feb. 4, 1941.   W. SHIMER   2,230,765
AIR CONDITIONING FILTER
Filed Feb. 2, 1939
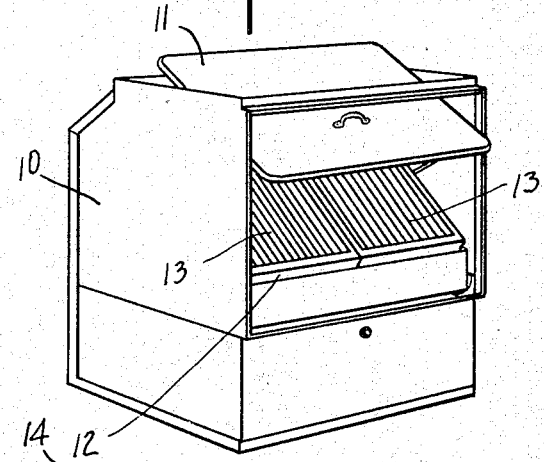
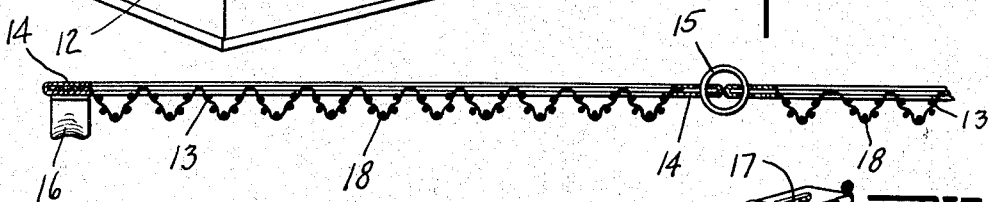
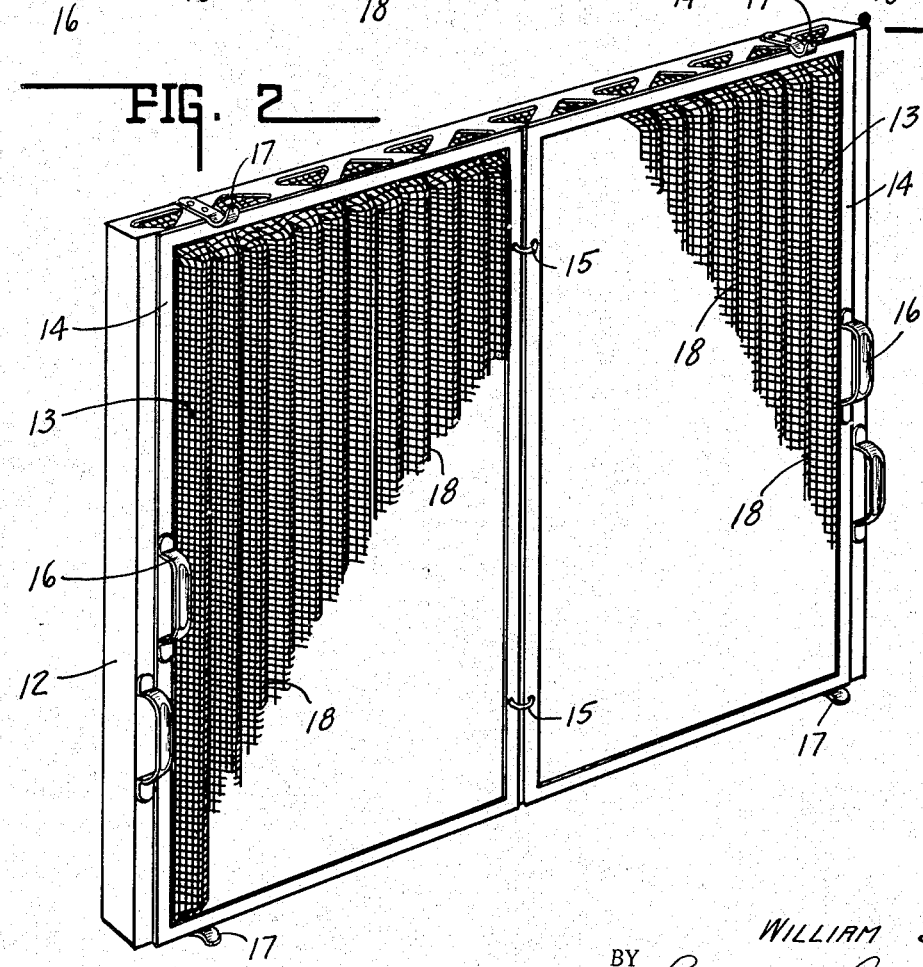
INVENTOR.
WILLIAM SHIMER.
BY Lockwood, Goldsmith & Galt
ATTORNEYS.

UNITED STATES PATENT OFFICE 2,230,765

AIR CONDITIONING FILTER

William Shimer, Indianapolis, Ind., assignor to Schwitzer-Cummins Company, Indianapolis, Ind., a corporation Application February 2, 1939, Serial No. 254,222

1 Claim. (Cl. 183—71)

This invention relates to a filter particularly designed for use in connection with the conditioning of air passing through a heating or cooling system, whereby the dust and dirt contained in the air will be removed and the air cleansed before being discharged.

Filters of this character must necessarily strain the air passing therethrough by means of tiny apertures formed by the interstices of woven fabric, whether of wire or other material. This results in the gradual clogging up of the interstices of the fabric forming the body of the filter. While it is natural and unavoidable that the interstices clog up through the accumulation of dust, grit, grease and the like, requiring it to be periodically cleansed or renewed, it is most desirable that larger substances, such as lint, hairs, thread, etc., will be prevented from entering the filter. Wherein this is accomplished, the life of the filter is much greater and the cleansing much simpler.

It is, therefore, the purpose of this invention to provide an auxiliary lint arrester in the form of a conveniently mountable and removable screen which will insure a more thorough cleansing of the air and permit freer passage thereof through the filter by preventing lint, hairs, thread, etc. from entering therein.

One feature of the invention resides in providing a foldable double acting screen frame provided with handles at each end to facilitate removal and folding thereof, and means for releasably securing it against one face of the filter.

Another feature of the invention resides in the provision of a filtering screen secured within the foldable removable frame, which screen is provided with a corrugated screen surface formed with a plurality of parallel ribs or ridges such as to not only increase the effective area, but presents the screen surface at an angle to the direction of the air intake.

The full nature of the invention will be understood from the accompanying drawing and the following description and claim.

Fig. 1 is a perspective view of an air conditioning unit showing the filter and screen mounted therein. Fig. 2 is a perspective view of the filter with the screen secured in place. Fig. 3 is a section through a portion of the screen.

In the drawing there is shown an air conditioning unit comprising a casing 10 having a sliding closure member 11 movable to top or side closing position. Mounted within the casing 10 and extending at an angle therein, there is provided a filter 12 covered by a screen 13, said filter and screen being so arranged as to intercept the passage of air through the casing for removal of dust and other foreign matter.

The filter screen is formed of a pair of metal frames 14 which span the exposed face of the filter and lie thereagainst when in extended position. The frames 14, which are rectangular, have their adjacent edges hinged together by the hinge rings 15. At opposite ends of the filter frames there are provided outwardly extending handles 16 for facilitating convenient removal thereof from the filter. The side walls of the filter are provided with spring latches 17 adapted to frictionally engage and clamp the screen in operative position, but permitting ready removal.

The frames 14 support a woven corrugated fabric which may be of screen wire having interstices of sufficient size to permit the free passage of air therethrough while arresting the passage of the larger substances which may be carried by the air, such as lint, hair, threads and the like. Such screen fabric is formed of a plurality of ridges, as indicated at 18, adapted to increase the effective area of the screen and also present its surface at an angle to the direction of flow of the foreign matter so as to more effectively pick it up and prevent its passage into the filter.

Periodically, the protective screen may be conveniently removed by grasping the handle 16 and folding it about the hinges 15 for removal from the casing 10. The foreign matter arrested thereby may then be quickly and easily taken from the screen, whereupon it may be replaced. In this manner, the filter proper is protected from clogging with such matter and it is thereby maintained with greater freedom of air passage and for the same reasons requires less cleansing.

The invention claimed is:

In an air filter, a hollow filter frame, a cover for said filter frame comprising a pair of screen frames hingedly connected together at adjacent edges, said sections of such size and shape as when extended to snugly fit within said filter frame, screen fabric formed with corrugated surfaces fitted within said frame sections with said surfaces protruding outwardly beyond the plane of said frame sections, and means for releasably securing said sections in extended position within said filter frame.

WILLIAM SHIMER.